(No Model.)

A. H. PETERSON.
PIPE HANGER.

No. 429,057. Patented May 27, 1890.

Witnesses:
Hamilton D. Turner
Alex. Barkoff

Inventor:
Albert H. Peterson
by his Attorneys
Howson & Howson

THE NORRIS PETERS CO., PHOTO-LITHO., WASHINGTON, D. C.

UNITED STATES PATENT OFFICE.

ALBERT H. PETERSON, OF PHILADELPHIA, PENNSYLVANIA, ASSIGNOR OF ONE-THIRD TO GEORGE P. A. GUNTHER, OF SAME PLACE.

PIPE-HANGER.

SPECIFICATION forming part of Letters Patent No. 429,057, dated May 27, 1890.

Application filed February 3, 1890. Serial No. 339,009. (No model.)

*To all whom it may concern:*

Be it known that I, ALBERT H. PETERSON, a citizen of the United States, and a resident of Philadelphia, Pennsylvania, have invented certain Improvements in Pipe-Hangers, of which the following is a specification.

The object of my invention is to so construct a pipe-hanger that it can be readily applied to or removed from the pipe and the suspending stud or pin, and this object I attain in the manner hereinafter set forth, reference being had to the accompanying drawings, in which—

Figure 1:
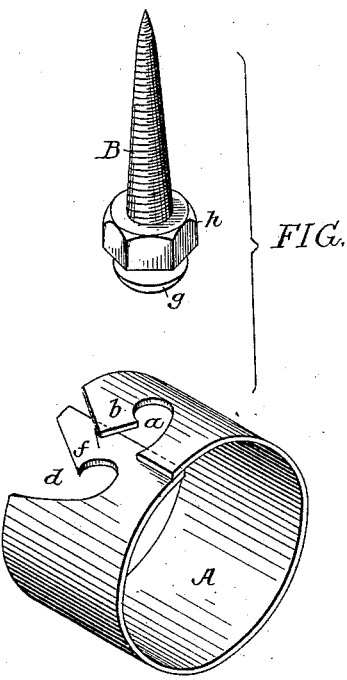
Figure 2:
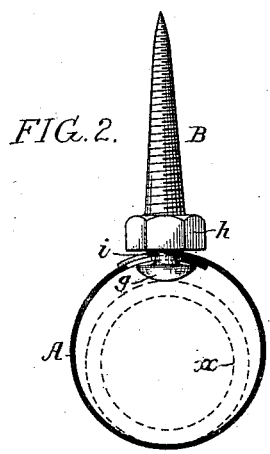
Figure 3:
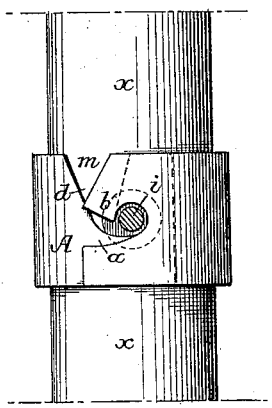
Figure 4:
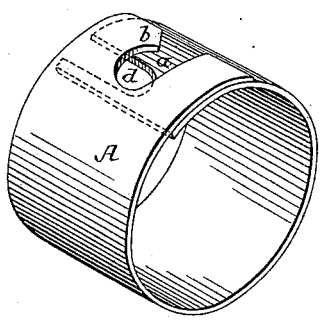
Figure 5:
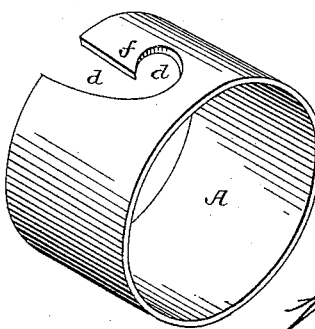

Figure 1 is a perspective view of the pipe-holder and its suspending-stud detached from each other. Fig. 2 is a sectional view showing the parts in position for suspending the pipe. Fig. 3 is a plan view of the pipe and holder with the suspending-stud in section; and Figs. 4 and 5 are perspective views illustrating modifications of the invention.

The pipe-holder shown in Figs. 1, 2, and 3 consists of a strip of sheet metal A bent into circular form, and having formed in one end a longitudinal notch or recess $a$, of such a character that the metal on one side of said recess forms a transversely-projecting hook $b$.

Near the other end of the strip a notch or recess $d$ extends first laterally inward from one of the side edges of the strip and then longitudinally toward the end of the strip, the metal on one side of this longitudinal portion of the recess likewise forming a transversely-projecting hook $f$.

The suspending stud or pin B of the hanger is driven or screwed into the joist or other support upon which the pipe is to be suspended, and this hook has at its lower end an enlarged head $g$, as shown in Fig. 1. If the stud is threaded, so as to be screwed into the joist or other support, it may also be furnished with a hexagonal or other polygonally-shaped flange or collar $h$, as shown in Fig. 2, for the reception of a wrench.

The metal of which the band A is composed possesses such elasticity that the free ends of said band may be separated sufficiently to permit the band to be slipped over the pipe $x$, and the band can then be applied to the suspending stud or pin by passing the neck $i$ of the latter first through the lateral portion of the recess or notch $d$ and then into the longitudinal portion of said recess until it engages with the hook $f$, the band being then closed, so as to cause the neck of the supporting-stud to enter the recess $a$ and engage with the hook $b$, as shown in Fig. 3. One end of the band A and one wall of the recess $d$ are preferably beveled, as shown in Figs. 1 and 3, so that on moving the shank of the suspending-stud into the V-shaped recess $m$ thus formed the ends of the band will be sprung apart until the shank reaches the longitudinal recesses, whereupon the band will close upon said shank by reason of its elasticity.

The longitudinal portion of the recess $d$ may, if desired, be dispensed with, as shown, for instance, in Fig. 4, and my invention may in some cases be carried out without the use of a split ring, as shown in Fig. 5, for instance, which represents a complete ring having a recess partly lateral and partly longitudinal, with a hook projecting laterally into the latter recess, so as to engage with the shank of the supporting-stud.

Having thus described my invention, I claim and desire to secure by Letters Patent—

1. The combination of the supporting stud or pin with a pipe-receiving ring or band recessed laterally and longitudinally, and having a hook extending laterally into said longitudinal recess, so as to engage with the neck or stem of the supporting-stud, substantially as specified.

2. The combination of the supporting stud or pin with the split ring or band for the reception of the pipe, said band having in one end a longitudinal recess and near the other end a lateral recess, said recesses overlapping each other when the band is contracted, substantially as specified.

3. The combination of the supporting stud or pin with the split ring or band having a longitudinal recess in one end and near the other end a recess partly lateral and partly longitudinal, substantially as specified.

4. The combination of the supporting stud or pin with the split ring or band having a longitudinal recess in one end and a recess partly lateral and partly longitudinal near the other end, both of said recesses having transversely-projecting hooks, substantially as specified.

5. The combination of the supporting stud or pin with the split ring or band having a longitudinal recess in one end and a lateral recess near the other end, and having the end of the band and inner wall of the lateral recess beveled, so that the band is self-opening on its application to the supporting-stud, substantially as specified.

In testimony whereof I have signed my name to this specification in the presence of two subscribing witnesses.

ALBERT H. PETERSON.

Witnesses:
EUGENE ELTERICH,
HARRY SMITH.